June 30, 1936.   F. S. HODGMAN   2,045,775
HAND ELECTRIC STEERING DEVICE FOR SHIPS
Filed Aug. 24, 1934   3 Sheets-Sheet 1
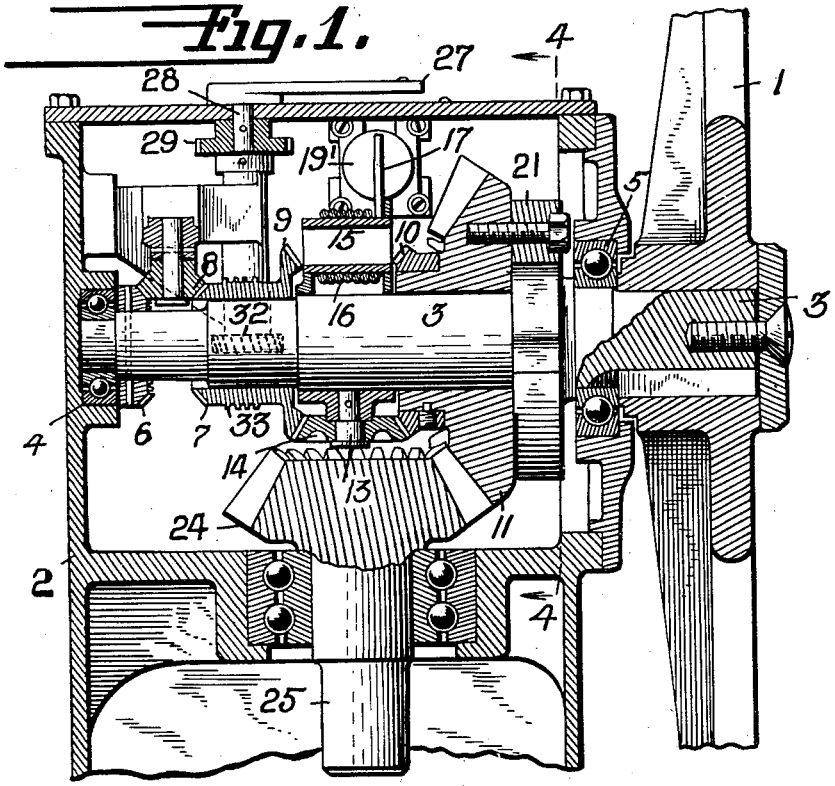
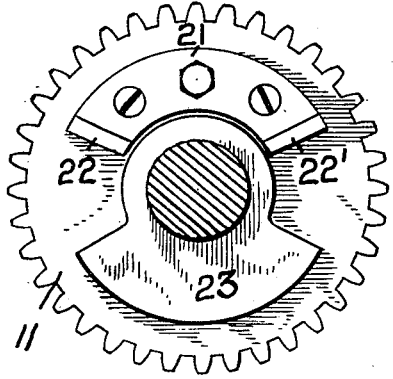
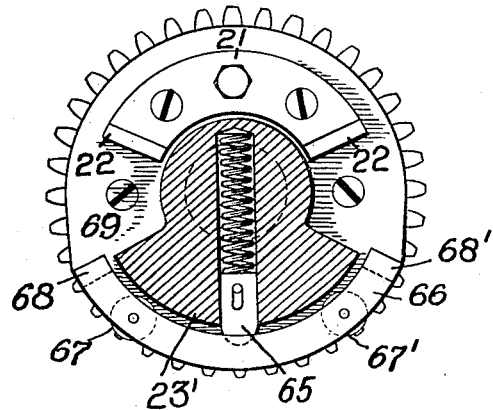
INVENTOR
FREDERICK S. HODGMAN
BY
Herbert H. Thompson
HIS ATTORNEY.

June 30, 1936.  F. S. HODGMAN  2,045,775
HAND ELECTRIC STEERING DEVICE FOR SHIPS
Filed Aug. 24, 1934  3 Sheets-Sheet 2
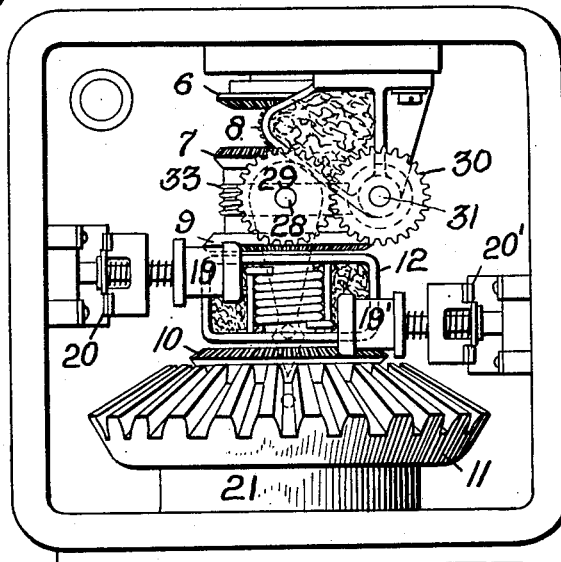
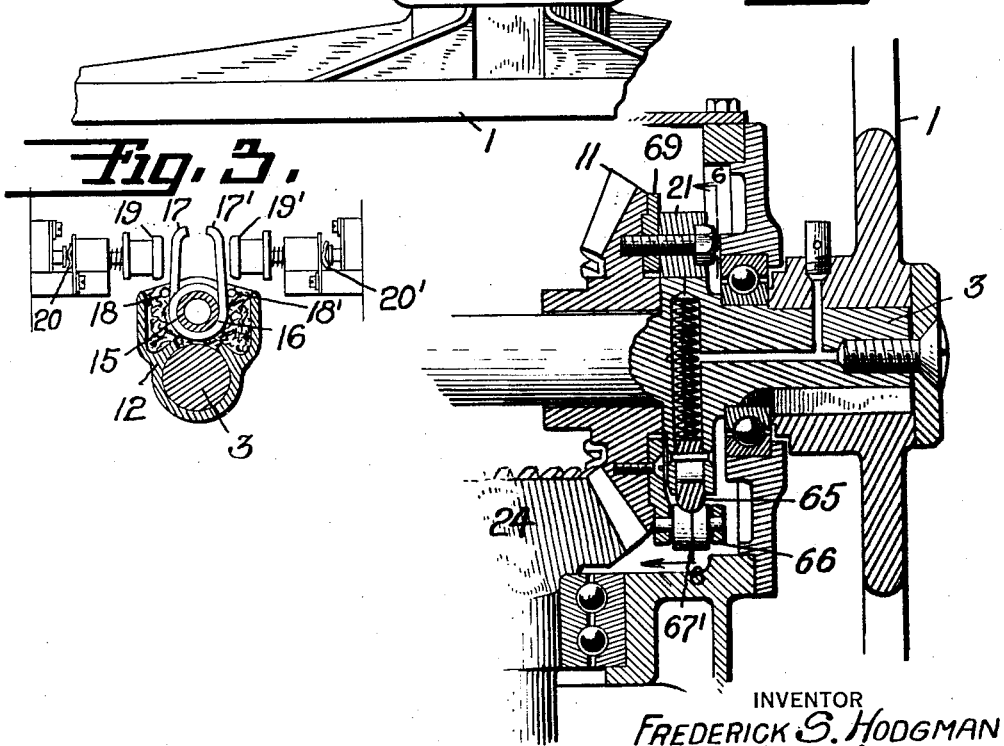
INVENTOR
FREDERICK S. HODGMAN
BY
Herbert H. Thompson
HIS ATTORNEY.

June 30, 1936.  F. S. HODGMAN  2,045,775
HAND ELECTRIC STEERING DEVICE FOR SHIPS
Filed Aug. 24, 1934  3 Sheets-Sheet 3
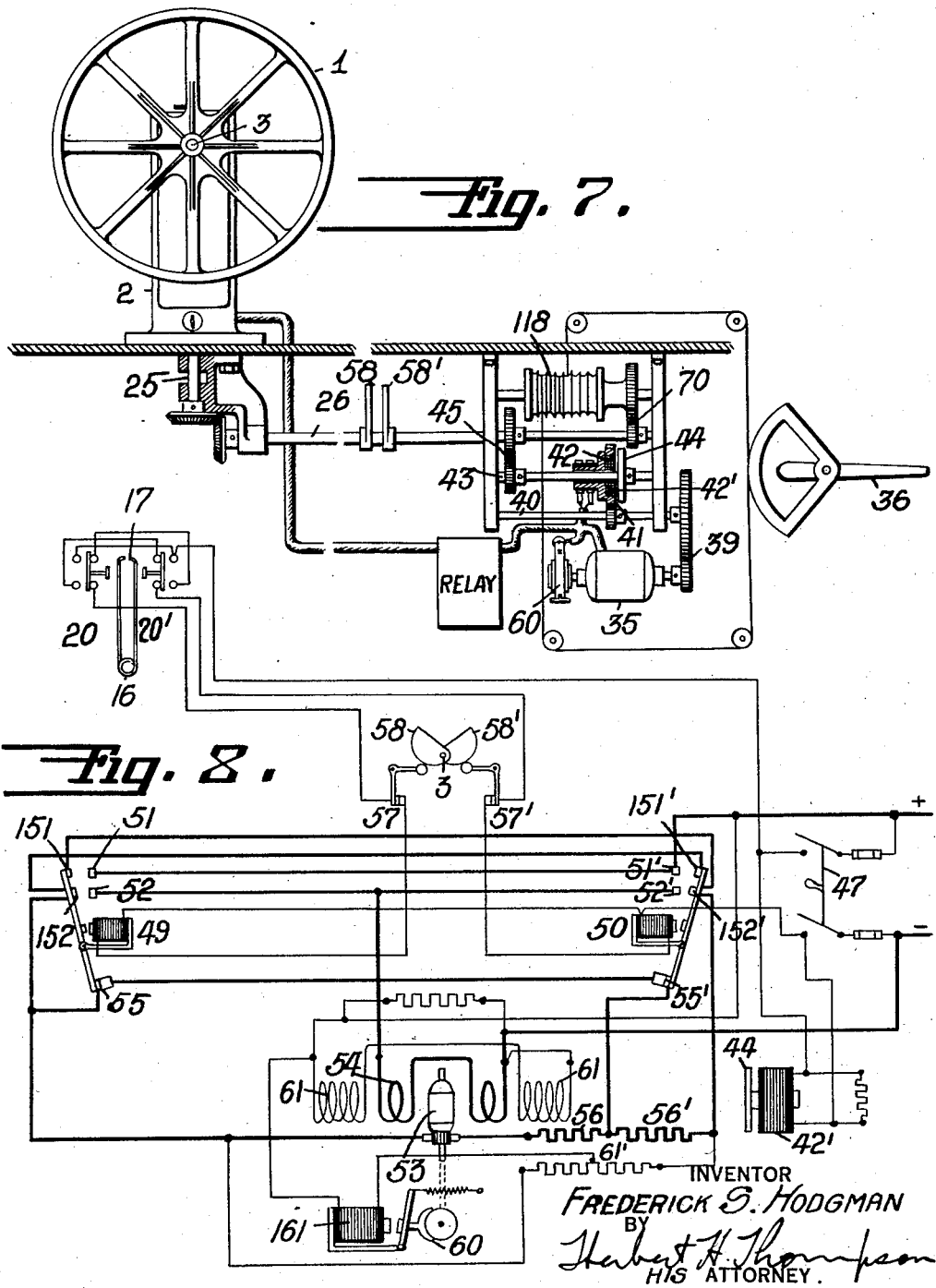
INVENTOR
FREDERICK S. HODGMAN
BY
HIS ATTORNEY.

Patented June 30, 1936

2,045,775

UNITED STATES PATENT OFFICE 2,045,775

HAND ELECTRIC STEERING DEVICE FOR SHIPS

Frederick S. Hodgman, Glen Rock, N. J., assignor to Sperry Gyroscope Company, Inc., Brooklyn, N. Y., a corporation of New York Application August 24, 1934, Serial No. 741,259

2 Claims. (Cl. 172—282)

This invention relates to an electric steering gear for dirigible craft, such as ships and aircraft. It is especially adapted for steering ships in which the manual work of turning the rudder by the pilot wheel is too burdensome for continuous operation. The purpose of the invention is to devise a practically infallible arrangement so that in case of failure of the electric supply or apparatus the pilot may continue to steer by hand through the same wheel by which he is controlling the ship electrically. A further object of the invention is to simplify greatly existing electric steering devices, whereby many of the contacts, rheostats, and circuit breakers which are usual in the ordinary commercial motor installation are eliminated. To this end, the motor circuits are arranged to limit the maximum current flowing therethrough, preferably by a resistance in series with the armature, and at the same time to limit the amount of torque that may be placed on the motor by means such as a slip friction clutch. By this combination the danger of stalling and/or burning out the motor is largely overcome without the employment of the usual rheostats, circuits breakers, or other safety devices and multiple relays.

By my invention I secure the further result of not only relieving the pilot of the work of turning the rudder through the handwheel, but also of the labor of continuing the turning of the handwheel after it is once started or brought up to a predetermined speed. In other words, by my invention the pilot (or helmsman) may steer through the pilot wheel (or hand wheel) as usual, or if he desires to move the wheel rapidly through large angles for maneuvering, he may initially bring the hand wheel up to a speed substantially equal to the follow-back speed from the steering engine, upon which the steering engine will continue to operate, turning both the rudder and the hand wheel until the hand wheel is grasped by the pilot and stopped, or the rudder limit switch is reached. By this arrangement a very important improvement is secured for smaller vessels, such as tow boats having a limited crew. By it the pilot is relieved of much of the work of turning the pilot wheel and may thus, when desiring to move the rudder through large maneuvering angles such as midships to hard right, or to any desired angle between hard left and hard right, simply start the wheel in the desired direction. He is then free to give attention to other duties, such as operation of main engines or observation of other vessels, or of the effect of engine and rudder upon his own vessel, the wheel continuing to rotate until stopped by the pressure of his hand or by the limit switch. Also, by having a positive follow-up connection from the rudder to the wheel, the synchronism between the two is never disturbed.

This application constitutes an improvement in the invention described in my prior application, now Patent 2,018,761, dated October 29, 1935, for Hand electric steering device.

Referring to the drawings in which several forms of my invention are shown,

Fig. 1 is a vertical section through the top of the steering stand.

Fig. 2 is a top plan view of the same with the cover removed.

Fig. 3 is a detail of the switch operating device.

Fig. 4 is a section taken on line 4—4 of Fig. 1.

Fig. 5 is a vertical section of a portion of the steering stand, showing a modified form of the invention.

Fig. 6 is a section taken substantially on line 6—6 of Fig. 5.

Fig. 7 is a diagrammatic view of my improved steering gear, showing the pilot wheel and stand in elevation and the electric steering motor for turning the rudder.

Fig. 8 is a wiring diagram of the preferred form of my invention.

In Figs. 1 and 7 the usual steering wheel 1 is shown as mounted in a stand or housing 2. The wheel is shown as mounted on a shaft 3, journalled in bearings 4 and 5 in said housing. Said shaft is shown as driving a bevel gear 6 which drives a second bevel gear 7 through a bevel idler 8 for the purpose of reversing the direction of rotation of gear 7. The gear 7 is shown as having an elongated hub, at the other end of which is secured another bevel gear 9 forming one arm of a differential gear train. The opposite arm is shown as comprising a bevel gear 10 secured to the hub of a larger bevel gear 11 freely mounted on the shaft 3. The middle or planetary arm of said gear train is shown as comprising a framework 12 rotatably mounted on shaft 3, and on which is journalled, on pin 13, another bevel gear 14 meshing with the aforesaid gears 9 and 10. Said frame has a hollow cross-shaft 15 secured therein, around which is wound a stiff spring 16, the free ends 17 and 17' of which extend upwardly and are normally held under tension by stop pins 18 and 18'. The free ends of said spring are also adapted to engage spring pressed plungers 19 and 19'.

In the position shown in Fig. 3, the switches 20 and 20' are normally biased open by said springs, but if the spring end 17 or 17' strikes one of the plungers, the corresponding switch is closed. Secured to the back of the gear 11 is shown a stop member 21 having leather faced buffers 22, 22', at the ends thereof. There is also secured to the shaft 3 annular stop or lug 23, which is adapted to strike one or the other of buffers 22 and 22' when the shaft 3 is revolved with respect to the gear 11 through a limited lost motion in either direction, said connection also acting to limit the amount of turning of the planetary arm of the differential, so that spring arms 17 and 17' are protected. Gear 11, in turn, meshes with a bevel gear 24 on the vertical shaft 25 extending through the stand and serving to drive the transmission shaft 26 extending to the servo motor, or steering motor, adjacent the rudder and also serving as a follow-back connecting from the rudder to open the contacts when the rudder is turned. Normally, therefore, a given movement of the hand wheel will move the rudder through a proportionate angle, whether the circuit through the motor be open or closed.

The steering stand may also be provided with a rudder indicator 27 on the top thereof. Said indicating pointer is shown as secured to a shaft 28, to which is also secured a gear 29. Said gear is driven from a gear 30 secured to a vertical shaft 31, having at the lower end thereof a worm wheel 32 meshing with threads 33 formed in the hub of the gear 7.

The operation of the parts so far described is as follows: When the wheel 1 is first turned, the rotation of the shaft 3 will cause one or the other of switches 20 or 20' to close before the lug 23 strikes the stop 21, sufficient lost motion being provided for this purpose. The closing of the switch actuates, as hereinafter described, an electric motor 35 for operating directly or indirectly the rudder 36. The shafts 26 and 25 in this case act as a follow-up connection from the rudder to the steering stand, so that when the rudder turns, gear 24 is revolved to revolve gear 11 and, hence, to open the switch 20 or 20'. In case, however, the electric system does not operate, the pilot merely continues to turn the wheel 1, whereupon the lug 23 will strike stop 21 and the gear 11 will be turned directly to drive the shafts 25 and 26 manually and hence turn the rudder through gears 70 and cable drum 118.

Motor 35 is shown as connected to the rudder through reduction gears 39 connecting the shaft of the motor to a shaft 40, which in turn is connected through reduction gears 41 to an electromagnetic clutch member 42. Said clutch member is loosely mounted on a shaft 43 but, when energized, attracts armature 44 on the shaft so as to turn said shaft when the clutch is turned. Shaft 43 is shown as geared through reduction gears 45 to shaft 26. The clutch coil 42' of clutch 42 is normally maintained closed so that instant action is secured upon the starting of the motor 35, and slipping of the clutch is avoided. In case, however, the power goes off or the pilot desires to steer by hand alone, the clutch is automatically opened in the first instance because there is no power to energize the same, and in the second instance the pilot opens the switch 47. By this or a similar throw-out clutch the pilot is relieved of the work of turning over the heavy motor armature when steering the ship by hand.

Preferably, however, additional means are provided to prevent the contacts 20 and 20' from being broken in case the pilot desires the steering motor to continue to operate after an additional movement of the hand wheel, as hereinafter described.

The preferred wiring layout in simplified form is shown in Fig. 8. In this figure the controller contacts 20 and 20' operate respectively through relay magnets 49 and 50. When contact 20' is made, a secondary circuit is closed from one side of the line at the upper knife switch 47 through 20, through 57, through magnet 49 and back to the other side of the line at the lower knife switch 47. The excitation of the magnet 49 closes contacts 51—151 and 52—152. This completes a circuit from one side of the line through contacts 51—151, thence through resistances 56' and 56, thence through the armature 53 and thence through contacts 52—152 to series field 54 and thence back to the other side of the line. The motor, therefore, will be driven in one direction but will be stopped by the opening of limit switch 57 which breaks the circuit through 49, thus permitting the biased relay to open. When, however, contact 20 is made, the secondary circuit is completed through contacts 20' and 57' and through magnet 50 to close contacts 51'—151' and 52'—152'. This completes the circuit from one side of the line through contacts 51'—151' and through the armature 53 in the opposite direction than before, and thence through the resistance 56, 56', thence through contact 52'—152', thence through the field 54 in the same direction as before, and thence to the other side of the line. Therefore, the motor will be driven in the opposite direction.

When both relays are de-energized, they establish back contacts 55 and 55' to cause dynamic braking by short-circuiting the armature through resistance 56. The motor is shown as compound wound, the shunt field windings 61, being continuously excited from the line so as to supply the field for dynamic braking. Limit switches 57, 57' are shown as operated respectively by cams 58, 58' operated directly or indirectly by shaft 26.

In addition to dynamic braking, an electro-mechanical brake 60 is also provided for the motor shaft. Said brake is shown as spring applied, but is held open by electromagnet 161 between one side of the line across the motor armature to the midpoint of potentiometer resistor 61' so that when the motor is running, the brake is off, but as soon as the current is interrupted to the armature, the brake is applied, because the resistor 61' is very much higher than that of short-circuiting resistance 56, so that brake 60 is applied during the dynamic braking period as well as afterwards. The brake is preferably applied to the high speed armature shaft rather than to the lower speed cable drum 118 or the intermediate gearing, so that a small brake may be used. This result is secured by keeping the clutch 42 in engagement during the entire period of operation of the electric steering gear.

The armature circuit is preferably of unusually high resistance to limit the current surge in starting and to obviate the necessity of auxiliary accelerating contactors. For this purpose resistance 56 and also, if desired, a second resistance 56' in series therewith act as a current limiting resistance permanently coupled in series with the armature. This resistance therefore limits both the current passing through the armature and the torque of the motor. Since the resistance of the water to turning the rudder when near its central or normal position is small, this does not interfere with quick starting: It also reduces the rudder speed near its limiting angle due to greater water resistance at large rudder angles. As distinguished from the usual load on commercial electric motors, a rudder does not require a large starting torque but, on the other hand, it is continually stopping and starting. If the usual commercial control is employed, using a series of resistance contacts for starting up, such contacts are in continuous operation, resistances being cut in and out successively and continuously, resulting in excessive wear. Applicant proposes, however, to leave resistances 56, 56' connected in the motor circuit since no great starting torque is required, and, further, to protect the motor and other apparatus, applicant provides the slip friction clutch 42, 44 hereinbefore described, which is designed to slip before the stall-torque is reached. My control, therefore, provides a minimum number of contacts and resistances in spite of the fact that dynamic braking is obtained.

Figs. 5 and 6 illustrate the preferred form of yielding device for maintaining the steering engine in operation after the hand wheel is brought up to speed. In these figures the lug 23' is shown as provided with a spring pressed plunger 65, the nose of which normally slides in a stirrup 66 secured on a plate 69, fastened to the bevel gear 11. In said stirrup are placed spaced rollers 67, 67'. By turning the hand wheel 1, therefore, far enough, the spring pressed plunger may be caused to ride over one or the other of said rollers, in which position it will descend between the roller and the end wall 68 or 68' on the plate 69. The plunger will hold the parts in this position and thus hold the contact 20 or 20' closed and prevent the same from being opened by the follow-up action of the shaft 25. The spring tension is arranged so that when the hand wheel 1 is released, the follow-back from the motor will push the plunger up over the roller due to the inertia of the hand wheel and associated gearing unless said wheel has been set approximately at the follow-back speed of the steering engine. In the latter case, however, the spring tension and friction are sufficient to hold the plunger between the roller and the stop, thus holding the corresponding contact closed and maintaining the operation of the steering engine either until the limit stop is reached or until the operator grasps the hand wheel 1 and stops it.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a combined hand and electric steering gear, the combination with the usual hand wheel and rudder, of a lost motion connection between the wheel and rudder comprising a differential gear train having three arms, one arm of which is turned from said hand wheel and another arm is connected to the rudder, a lost motion connection between said hand wheel and said second arm, a pair of opposed spring pressed contact plungers adjacent said third arm, a yielding member on said third arm adapted to strike either one or the other of said plungers when said arm is turned in one or the other direction, said plungers also acting as positive stops for said third arm in each direction, a motor controlled thereby for operating the rudder, the aforesaid connection between said differential and the rudder serving as a follow-back to said contacts from said motor, and an electric clutch between said motor and rudder, whereby said motor is disconnected when the electric circuit fails or is disconnected.

2. In a combined hand and electric steering gear, the combination with the usual hand wheel and rudder, of a lost motion connection between the wheel and rudder comprising a differential gear train having three arms, one arm of which is turned from said hand wheel and another arm is connected to the rudder, a lost motion connection between said hand wheel and said second arm, yielding contact means operated by the turning of the third arm in each direction, and a motor controlled thereby for operating the rudder, the connection between said second mentioned arm and the hand wheel including a yielding catch adapted to hold said contacts closed when the hand wheel has been brought substantially up to the follow-back speed of the motor.

FREDERICK S. HODGMAN.